US006823390B1

(12) United States Patent
Bauwens et al.

(10) Patent No.: US 6,823,390 B1
(45) Date of Patent: Nov. 23, 2004

(54) METHOD OF SETTING UP DATA COMMUNICATION WITH A COMMUNICATION MEANS AND FURTHERMORE PROGRAM MODULES AND MEANS THEREFOR

(75) Inventors: Bart Bauwens, Zaventem (BE); Dominique Chantrain, Edegem (BE); Hans Vanderstraeten, Lebbeke (BE)

(73) Assignee: Alcatel, Paris (FR)

( * ) Notice: Subject to any disclaimer, the term of this patent is extended or adjusted under 35 U.S.C. 154(b) by 669 days.

(21) Appl. No.: 09/615,759

(22) Filed: Jul. 13, 2000

(30) Foreign Application Priority Data

Mar. 4, 2000 (EP) .......................................... 00104768
May 26, 2000 (EP) .......................................... 00440159

(51) Int. Cl.$^7$ ............................................ G06F 15/16
(52) U.S. Cl. .................................................. 709/228
(58) Field of Search ............................... 370/469, 446; 707/102; 709/228, 221, 224, 239; 713/201; 379/229; 455/433, 552

(56) References Cited

U.S. PATENT DOCUMENTS

| | | | |
|---|---|---|---|
| 5,509,006 A | | 4/1996 | Wilford et al. |
| 5,548,723 A | * | 8/1996 | Pettus ........................ 709/228 |
| 5,574,919 A | | 11/1996 | Netravali et al. |
| 5,764,750 A | * | 6/1998 | Chau et al. ................. 379/229 |
| 5,790,648 A | * | 8/1998 | Bailis et al. .......... 379/201.04 |
| 5,946,634 A | * | 8/1999 | Korpela ................. 455/552.13 |
| 6,061,796 A | * | 5/2000 | Chen et al. ................. 713/201 |
| 6,098,108 A | * | 8/2000 | Sridhar et al. .............. 709/239 |
| 6,125,122 A | * | 9/2000 | Favichia et al. ............ 370/466 |
| 6,188,898 B1 | * | 2/2001 | Phillips ...................... 455/433 |
| 6,311,215 B1 | * | 10/2001 | Bakshi et al. ............... 709/221 |
| 6,408,335 B1 | * | 6/2002 | Schwaller et al. ......... 709/224 |
| 6,496,858 B1 | * | 12/2002 | Frailong et al. ........... 709/221 |
| 6,539,030 B1 | * | 3/2003 | Bender et al. .............. 370/469 |
| 6,578,042 B2 | * | 6/2003 | Arrouye et al. ............. 707/102 |
| 6,594,505 B1 | * | 7/2003 | Ishii ........................ 455/552.1 |

FOREIGN PATENT DOCUMENTS

| | | |
|---|---|---|
| WO | WO 99/20024 A1 | 4/1999 |

OTHER PUBLICATIONS

Yow–Wei Yao et al.: "Constructing Protocol Converters from Service Specifications" Proceedings of the International Conference on Distributed Computing Systems. Yokohama, Jun. 9–12, 1992, Los Alamitos, IEEE Comp. Soc. Press, US, vol. Conf. 12, Jun. 9, 1992, pp. 344–351, XP000341031.

* cited by examiner

Primary Examiner—John Follansbee
Assistant Examiner—Dustin Nguyen
(74) Attorney, Agent, or Firm—Sughrue Mion, PLLC (57) ABSTRACT

The invention relates to a method of setting up data communication with a communication means (TERA), a first (TERA) and a second (TERB) communication means therefor, set-up program modules (PMPA and PMPB) therefor, a test means (CK) therefor and a test module (PMCK) for a test means. The first communication means (TERA) possesses at least one protocol module (P11A, P21A and BA) for data communication via at least one first layer of a communication protocol. The second communication means (TERB) sends a test means (CK) at least one target protocol property of the at least one first or one second layer of the protocol for data communication with the first communication means (TERA). The first communication means (TERA) sends the test means at least one actual protocol property of the at least one layer, able to be processed by the at least one protocol module (P11A, P21A and BA), of the protocol. The test means compares the at least one actual protocol property with the target protocol property. After this, in manner dependent on the respective result, the test means sends the first (TERA) and/or the second (TERB) communication means an instruction for the execution of a subsequent action.

17 Claims, 3 Drawing Sheets

METHOD OF SETTING UP DATA COMMUNICATION WITH A COMMUNICATION MEANS AND FURTHERMORE PROGRAM MODULES AND MEANS THEREFOR

BACKGROUND OF THE INVENTION

The present invention relates to a method for setting up data communication with a communication means, communication means therefor, set-up modules for communication means therefor, a test means therefor and furthermore a test module for a test means.

The requirements to be met by the ability of telecommunication terminals to communicate using different telecommunication protocols are becoming increasingly dynamic. For instance a personal computer, which has a sound board for voice input and output, may be equipped for VoIP (voice over Internet protocol) communication using suitable application software. The user of the personal computer must for this purpose download the application software from the Internet or from a memory or storage medium, as for example a CD-ROM, to his personal computer and install same with the aid of an installation program. So-called lower protocol layers are processed during the following VoIP communication by an operating system installed on the personal computer and higher protocol layers by the VoIP application software. The protocol layers may then for example be superposed in accordance with the so-called ISO (International Standardization Organization) model in seven layers on a so-called protocol stack. It may however happen that the newly installed VoIP application software processes protocol layers, which are already being processed by the operating system so that cooperation between the operating system and the VoIP application software free of collisions becomes impossible. The user of the personal computer would in such a case have to install VoIP application software, that does not cause such a problem. The location of such VoIP application software is however frequently a tedious operation for the user or often impossible. Furthermore the above mentioned installation may mean that the newly located VoIP software automatically replaces software components, as for instance library functions, by new software components, which are possibly incompatible with other software components installed on the personal computer. In another scenario application software for multimedia communication is installed on the personal computer so that the personal computer is able to transmit and receive pictures, voice and data. Normally the Internet is employed for multimedia communication. For improved transmission quality it may however serve a good purpose to utilize a circuit switched telecommunication network as an alternative or in addition to the Internet. For this purpose the user must however know whether his communication partner has an terminal, capable of cooperating. Furthermore the user himself must switch over to the alternative transmission path.

SUMMARY OF THE INVENTION

Accordingly one object of the invention is to provide for convenient adaptation of a communication means to changing protocol requirements.

According to the invention, this object is attained by a method for setting up data communication with a first communication means, which possesses at least one (first) protocol module for data communication via at least one first layer of a communication protocol, the at least one (first) protocol module containing a program code able to be executed by a control means of the first communication means, comprising the steps of: transmitting by a second communication means at least one target protocol property of the at least one first or one second layer of the protocol for data communication with the first communication means to a test means; determining by the first communication means at least one (first) actual protocol property of the at least one first layer of the protocol, the layer of the protocol being able to be processed by the at least one (first) protocol module; transmitting by the first communication means to the test means the at least one (first) actual protocol property; comparing by the test means the at least one (first) actual protocol property with the target protocol property; and transmitting by the test means in a manner dependent on the respective result of an instruction for the execution of a subsequent action to the first and/or the second communication means.

The object of the invention is further attained by a setting up module for a first communication means for setting up data communication with the first communication means which comprises at least one first protocol module for communication via at least one first layer of a communication protocol, wherein; said at least one first protocol module and said set-up module respectively contain a program code able to be executed by a control means of the first communication means; the set-up module comprises recognition means for detection of at least one first actual protocol property of the at least one layer of the protocol, the layer being able to be processed by the at least one first protocol module; the set-up module comprises transmission means for transmission of the at least one first actual protocol property to a test means; and the set-up module possesses receiving means for receiving an instruction, in which the first communication means is instructed to execute a subsequent action in a manner dependent on the at least one first actual protocol property.

The object of the invention is further attained by a test module for a test means, the module containing: a program code able to be executed by a control means of the test means; receiving means for receiving at least one target protocol property of the at least one first or one second layer of the protocol for data communication with the first communication means, the receiving means being adapted to receive at least one (first) actual protocol property of the at least one first layer, able to be processed by the at least one (first) protocol module, of the protocol; comparison means for comparison of the at least one (first) actual protocol property with the target protocol property; and transmission means for the transmission of an instruction for the execution of a subsequent action to the first communication means and/or to a second communication means communicating with the first communication means, in a manner dependent of the respective result as determined by the comparison means.

The invention further resides in a set-up module for a second communication means for setting up data communication with a first communication means, the set-up module containing a program code able to be executed by a control means of the second communication means, the set-up module containing transmission means for the transmission of at least one target protocol property of at least one layer of a protocol for data communication with the first communication means to a test means.

The invention still further resides in a first communication means for setting up data communication with a second communication means, the first communication means comprising: at least one (first) protocol property for data communication via at least one first layer of a communication protocol, the at least one (first) protocol module comprising a program code able to be executed by a control means of the first communication means; recognition means (PMPA) for detection of at least one (first) actual protocol property of the at least one first layer, able to be processed by the at least one (first) protocol module, of the protocol; transmission means for the transmission of the at least one (first) actual protocol property to a test means; and receiving means for receiving of an instruction, in which the first communication means is instructed to perform a subsequent action in a manner dependent on the at least one (first) actual protocol property.

Still further, the invention resides in a test means for setting up data communication with a first communication means which comprises at least one (first) protocol module for data communication via at least one first layer of a communication protocol, said at least one (first) protocol module containing a program code able to be executed by a control means of the first communication means, the test means comprising: receiving means for receiving at least one target protocol property of the at least one first or of one second layer of the protocol for data communication with the first communication means, the receiving means being adapted for receiving at least one (first) actual protocol property of the at least one first layer, able to be processed by the at least one (first) actual protocol module, of the protocol; comparison means for comparison of the at least one (first) protocol property with the target protocol property; and transmission means for the transmission of an instruction for the performance of a subsequent action to the first and/or second communication means in a manner dependent on the respective result determined by the comparison means.

The invention further resides in a second communication means for setting up data communication with a first communication means, the set-up module comprising transmission means for the transmission of at least one target protocol property of at least one layer of a protocol for data communication with a first communication means to a test means.

In this respect one principle of the invention is that the different protocol layers of a protocol stack individually or partly in groups are to be processed in bundled manner by separate, interactive protocol modules, whose respective program code is executed by a processor of a first communication means, as for instance of a personal computer or a mobile telephone terminal. Prior to communication between the first communication means and a second communication means the respective requirements as regards the protocol stack of the first communication means, that is to say its target or desired properties, are determined and transmitted to a test means. The test means is for example a server of a telecommunication network or a program module, which is executed by the first and/or second communication means. Furthermore actual or real protocol properties of the protocol modules already present on the first communication means are transmitted to the test means. For modelling these properties, that is encoding these properties prior transmission, it is convenient to employ a so-called schema language, for example based on the RDF (Resource Description Framework) data model and schema language, in accordance with the World Wide Web Consortium (W3C) Recommendation, typically using XML (extensible Markup Language) tags to encode and transmit the metadata information. The test means then compares the actual or true properties with the target properties and sends the communication means, in a manner dependent on the respectively determined result, an instruction for the performance of subsequent action, in which the communication means is instructed, for example, to install a new protocol module cooperating with the protocol modules already installed on the first communication means. Furthermore it is possible for the first communication means to be instructed in the instruction to activate such already-installed protocol modules, which support imminent communication in an optimum manner.

Accordingly in each case use is made in the communication means of the protocol modules which are optimum for communication. This is made possible in the invention on the one hand by the concept of protocol modules and on the other hand by the negotiation of their respective properties as a preliminary to a communication. Furthermore, it is possible for an installed communication means to be adapted to actual requirements in a simple fashion.

Adopting the principles of the first example mentioned the VoIP application software only provides the service and application functions, whereas protocol functions on protocol layers under the VoIP application are performed by protocol modules installed on the personal computer which may also support further applications. If later an updated version of the VoIP application software is installed on the personal computer, it is possible to make further use of the protocol modules so that no compatibility problems arise with other applications, which possibly employ these protocol modules as well.

BRIEF DESCRIPTION OF THE DRAWINGS

The following description will serve to explain the advantages of the invention on the basis of working examples as illustrated in the accompanying drawings.

DETAILED DESCRIPTION OF THE INVENTION

Figure 1:
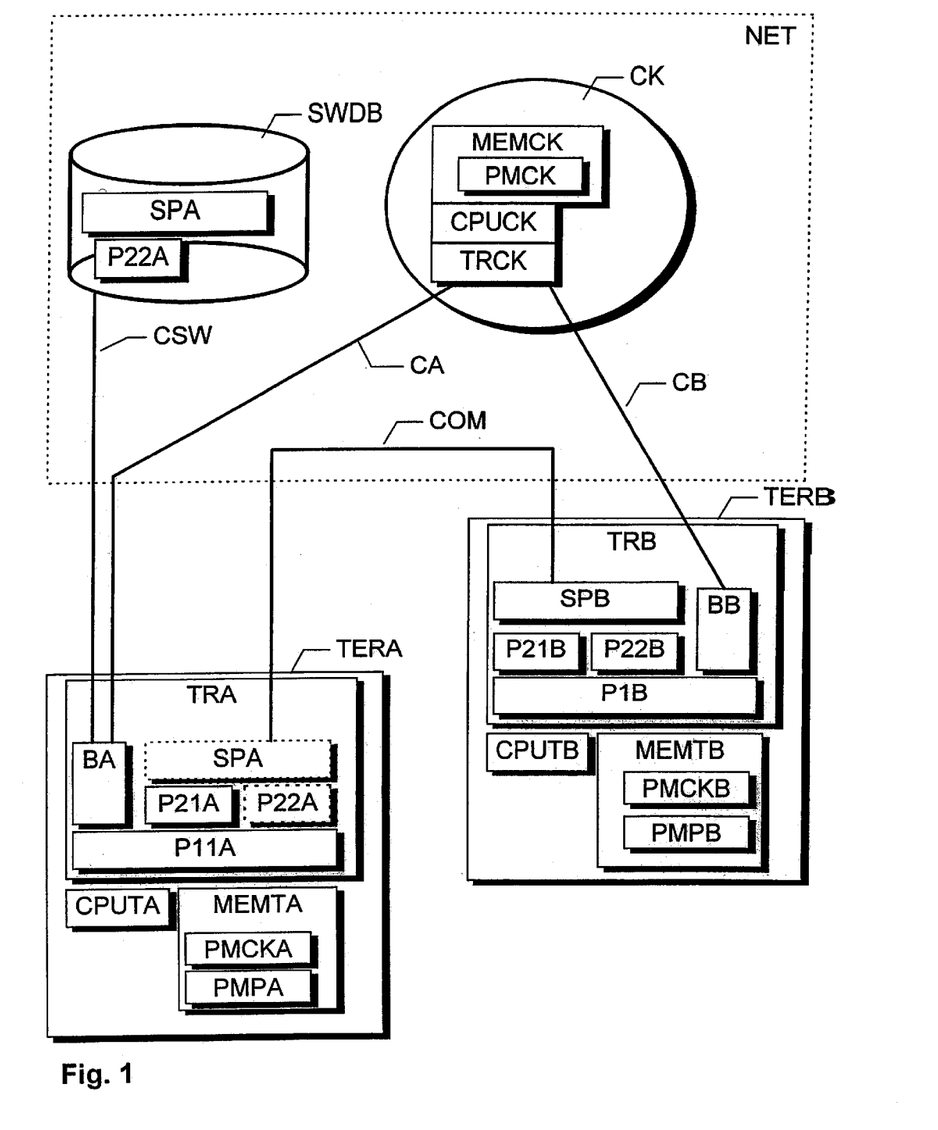
FIG. 1 shows an arrangement for the performance of the method in accordance with the invention using terminals TERA and TERB, a test server CK in accordance with the invention and a software server SWDB.

FIG. 1 shows a very diagrammatically presented arrangement by way of example, with which the invention may be put into practice. FIG. 1 shows terminals TERA and TERB serving as communication means, in the case of which it is for example a question of personal computers or mobile telephone terminals. For simplification the terminals TERA and TERB are of similar design and only diagrammatically depicted as block diagrams of functions. The terminals TERA and TERB possess connecting means TRA and TRB for the transmission and reception of data via a telecommunication network NET, which for example will be a mobile radio network or a circuit switched telecommunication network, the Internet or any desired combination of such networks. The connecting means TRA and, respectively, TRB for example comprise modems, ISDN (integrated services digital network) adapters or wireless interface modules. Furthermore the terminals TERA and TERB possess control means CPUTA and, respectively, CPUTB and also memory means MEMTA and, respectively, MEMTB, which are respectively connected with each other and with the connecting means TRA and, respectively, TRB by connections, which are not illustrated. The control means CPUTA and CPUTB, respectively, are for example processors with which a program code may be executed, which is stored in memory means MEMTA and, respectively, MEMTB. The memory means MEMTA and MEMTB are for instance in the form of fixed disks or RAM modules. Furthermore the terminals TERA and TERB have display means as for example LCDs (liquid crystal displays) and input means, for example keyboards. Further components which are not illustrated are speakers microphones for voice input and output. The terminals TERA and TERB are run by an operating system.

In the terminal TERA protocol modules P11A, BA and P21A are installed, which respectively contain a program code, which is executed by the control means CPUTA and/or by a control means, which is not illustrated, of the connecting means TRA. On a lower protocol layer the protocol module P11A serves the physical connecting interface of the terminal TERA and provides data transport capacity for superposed protocol layers on a basic connecting layer. The protocol module P11A may for example perform functions of the Internet protocol (IP) or of the TCP/IP (transmission control protocol/Internet protocol). The protocol module P21A and also the protocol module BA operate on the protocol layer of the protocol module P11A, with which protocol module BA the terminal TERA may establish a connection CA to a test server CK and a connection CSW with a software server SWDB. The protocol modules P21A and BA on the one hand and the protocol module P11A on the other hand each have mutually compatible interfaces, so-called APIs (application program interfaces). The protocol modules P11A and BA are administered by the operating system of the terminal TERA or are integrated in the operating system.

When a connection COM is to be established from the terminal TERA to the terminal TERB, it is firstly necessary to determine whether the two terminals have respectively mutually compatible communication means in them. In the present case the intention is to establish multimedia communication via the Internet. Therefore the terminal TERA determines the actual protocol properties, with the aid of a program module PMPA, of the protocol layers respectively processed by the protocol modules P11A and P21A and communicates the actual protocol properties and the request for the connection COM to the server CK functioning as a test means.

The real or actual protocol properties comprise for instance parameters for the identification of the respective protocol layers, e.g. the name of the respective protocol, the version number, the standard, the salesperson of the present implementation of the protocol etc. Furthermore it is possible for the actual properties to contain parameters for the description of functions of the respective protocol layers, as for example the protocol type (signalizing protocol, transport protocol) the type of sequencing of data packets or the type of encoding of protocol messages. Furthermore it is possible for parameters on compatibility to be included, as for example that the protocol module P11A is processing a protocol layer, which may carry the protocol layer processed by the protocol module P21A. In addition in the present case the "vocabulary" of the protocol module P21A is specified, that is to say the scope and the type of protocol messages, which the protocol module P21A can process. Further parameters are readily possible. It is however also possible for only a single one of the above mentioned parameters to be transmitted, if same as such unequivocally identifies the actual properties of the protocol module P21A. The server CK is then able to obtain further actual properties, for example from a data base, which is not illustrated.

Some important components of the server CK are depicted by way of example, namely a control means CPUCK, memory means MEMCK and connecting means TRCK. Using the connecting means TRCK it is possible for the server CK to establish the connections CA and CB and further connections, which are not illustrated. In the case of the control means CPUCK it is a question of a processor or a group of processors, which are able to execute the program code of program modules, which are stored in the memory means MEMCK. The control means CPUCK controls the function of the server CK and while so doing for example influences the further function of the connecting means TRCK. The connecting means TRCK, the control means CPUCK and the memory means MEMCK are connected with one another by connections which are not illustrated in FIG. 1. The server CK is operated by the operating system, as for instance Unix, and is associated with the telecommunication network NET.

The terminal TERA sends the server CK the above mentioned protocol parameters. The server CK models these parameters in the present embodiment in a schema language, for example in the above mentioned RDF or in another schema language in the XML family. A schema language typically allows to define classes (as in an object-oriented model), their properties, constraints and datatypes. A collection of classes, typically authored for a specific purpose or domain in the present case for transmission of protocol parameters, is called a schema. Classes are organised in a hierarchy, and offer extensibility through subclass refinement. This way, in order to create a schema slightly different from an existing one, it is possible just to provide incremental modifications to the base schema. Through the sharability of schemas a schema language like RDF supports the reusability of metadata definitions. Once a schema has been defined, metadata, in the present case protocol parameter data, can be expressed and exchanged. The (meta)data can be validated according to the developed schema. In this respect for instance value ranges for a parameter are indicated in the meta-data so that a specifically indicated parameter may be tested for admissibility.

In this way, a schema can be defined to describe the properties of the protocol layer processed by the protocol module P21A. The classes and properties defined in the schema can make use of inheritance mechanisms, which allow very flexible ways of updating the schema, e.g., the defining a new property, adding a new class, etc. Due to a schema language's incremental extensibility, an agent processing metadata, in the present case the server CK, is able to trace the origins of schemata it is unfamiliar with back to known schemata and perform meaningful actions on metadata the agent is not originally designed to process. Thus it is possible, to introduce on-the-fly new functionality.

The terminal TERA may send the server CK not only protocol parameters but also its physical properties, as for example indicating that the terminal TERA possesses a wired interface and also a wireless interface. For this purpose the terminal TERA will for example employ the CC/PP (composite capabilities/preferences profile) language in accordance with the recommendation of the World Wide Web Consortium (W3C).

Once the server CK has received the protocol parameters of the protocol modules installed on the terminal TERA, the server CK will request the terminal TERB to supply it with the target or desired protocol properties of the protocol layers necessary for the desired connection COM. The corresponding request will be sent by the server CK via the connection CB to the terminal TERB, which receives the request with a protocol module BB, which performs similar functions to those of the protocol module BA. In the terminal TERA protocol modules P11A and P21B are furthermore installed, which perform similar functions to those of the protocol modules P11A and P21A. Moreover the terminal TERB also has a protocol module P22B and furthermore a service module SPB rendering possible multimedia communication via the connection COM. The protocol module P22B supplements the protocol module P21B and may transmit and receive additional messages via the same protocol layer like the protocol module P21B. The protocol module P22B could also be designed for additional safety functions, such as for an encrypting algorithm, for data transfer. The service module SPB can transmit and receive service data via the protocol stack of the protocol modules P12B, P22B and P21B. The terminal TERB uses a program module PMPB to transfer the properties of the protocol layers, processed by the service module SPB and the protocol modules P21B and P22B, to the server CK as target protocol properties. For the transfer of the target protocol properties it is an advantage to employ the same schema language as employed by the terminal TERA.

With the aid of a program module PMCK executed by the control means CPUCK the server CK then examines the extent to which the actual properties as received by the terminal TERA correlate with the target properties received by the terminal TERB. In this respect the server CK determines that the terminal TERA is not able to perform such functions as are performed by the protocol module P22B and also by the service module SPB. Consequently the server CK gives the terminal TERA an instruction to install a protocol module P22A and furthermore a service module SPA, whose functionality is the same as that of the protocol module P22B and, respectively, the service module SPB. This instruction may be encoded in RDF for example and comprise a so-called set-up file. In the present case the instruction comprises the address of the software server SWDB in the form of an URL (uniform resource location) address and an OSD (open software distribution of the Microsoft Company) file. The terminal TERA then sends the server SWDB a request for the protocol module P22A and the service module SPA and installs same. In this respect it is possible for the operator of the terminal TERA firstly to have to enable the installation procedure or for the operator to be able to intervene in the installation operation. The completed installation operation is indicated by the protocol module P22A and service module SPA in chained lines in the terminal TERA. The terminal TERA then has a protocol stack P11A, P21A, P22A and SPA, which is complete both horizontally and also vertically, necessary for the connection COM.

The server CK may also in case of need instruct the terminal TERA to exchange the protocol module P21A for more recent one, which is compatible with the service module SPA. Furthermore it is possible for the protocol module P22A and the service module SPA to be loaded from different servers.

In addition to the working embodiment of FIG. 1 with a separate server CK it is also possible for a test module similar to the program module PMCK to be installed in the terminal TERA and/or the terminal TERB, such module being executed by the respective control means CPUTA and, respectively, CPUTB and which performs the described functions of the module PMCK. Therefore a test module PMCKA is installed in the terminal TERA. The terminal TERA sends the test module PMCKA the actual protocol properties and request from the terminal TERB the target properties of the protocol layers necessary for the desired connection COM. The test module PMCKA then determines the missing protocol module P22A and the missing service module SPA and instructs the terminal TERA to perform the respective installation.

A test module PMCKB operating similarly to the test module PMCKA is installed in the terminal TERB. The terminal TERB may hence request the terminal TERA to supply its actual protocol properties and supply same in addition to the target protocol properties of the protocol layers necessary for the desired connection COM to the test module PMCKB. The test module PMCKB then supplies the terminal TERA with an instruction to install the protocol module P22A and of the service module SPA.

Figure 2:
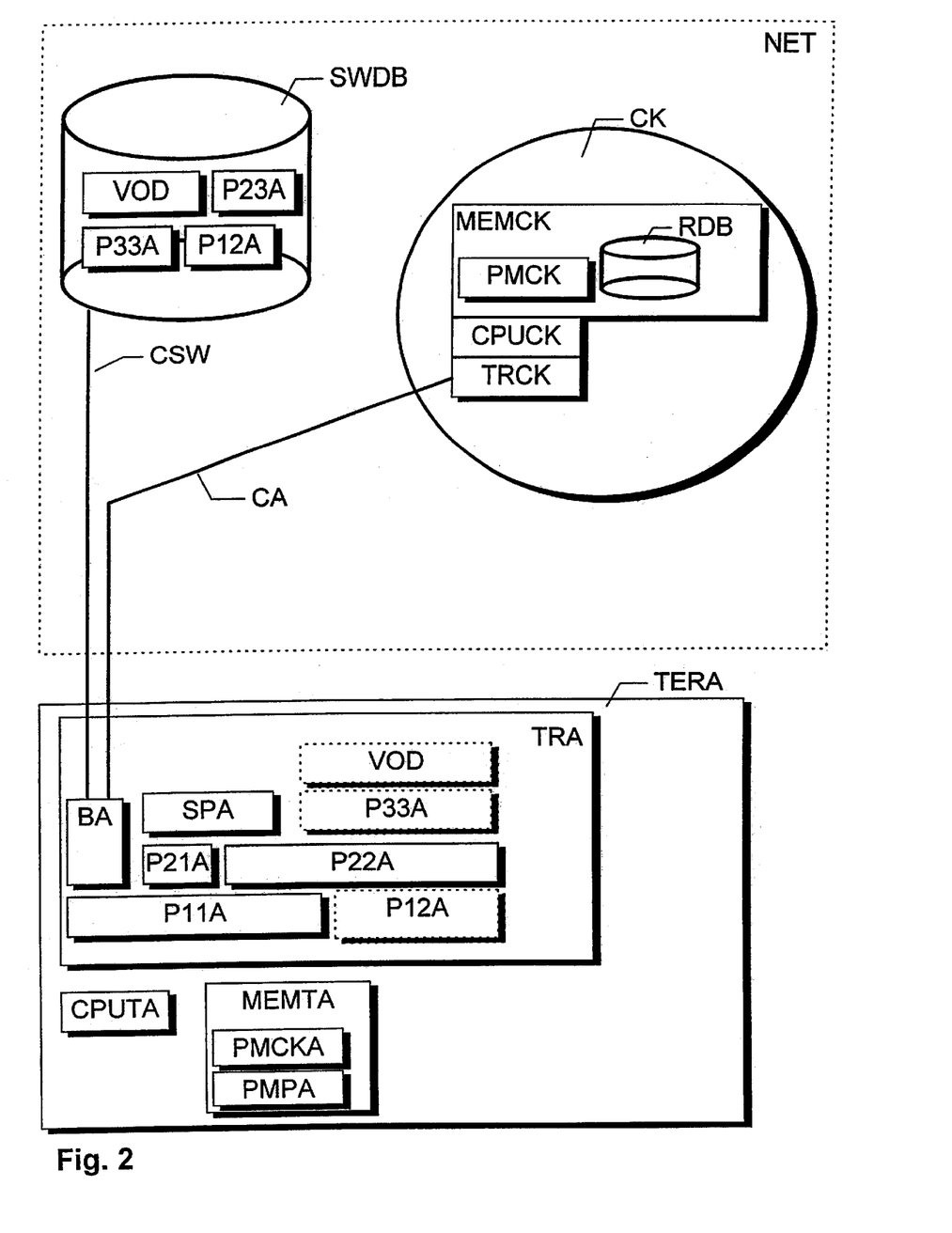
FIG. 2 shows essentially the same arrangement as in FIG. 1 but however without the terminal TERB.

FIG. 2 shows the arrangement as illustrated in FIG. 1 but without the terminal TERB and the connections CB and COM. Unlike the arrangement of FIG. 1 the server CK now also performs the function of the terminal TERB, that is to say of a communication means. The terminal TERA is to be equipped for participation in a new service, as for example video-on-demand. The terminal TERA consequently sends the server CK a corresponding request and the actual protocol properties of the modules P11A, P22A, P21A and SPA already installed on the terminal TERA via the connection CA. The type of parameters and furthermore the meta-data to be preferably employed have already been explained with reference to FIG. 1. The actual protocol properties are supplied to the program module PMCK. The server PC extracts first target protocol properties form a data base RDB, which properties are optimally necessary for the video-on-demand service. The server CK sends the program module PMCK these first target properties, and the server then determines that additional protocol modules P12A, P23A and P33A and furthermore a service module VOD must be installed in the terminal TERA for the processing of the video-on-demand service data. The protocol module P23A would admittedly be available in the server SWDB, but would however replace the protocol module P21A already installed in the terminal TERA. This would lead to compatibility problems however, because the service module SPA requires the functions of the protocol module P21A. Therefore the program module PMCK requests second target protocol properties from the data base RDB and checks to see whether same are more in harmony with the actual protocol properties of the protocol modules P11A and P21A already installed on the terminal TERA. This is so in the present case. Therefore the server CK sends the terminal TERA an instruction only to load the protocol modules P12A and P33A and furthermore the service module VOD, but not however the protocol module P23A, from the server SWDB and to install same.

Modules P12A, P33A and VOD installed in the terminal TERA in accordance with the instruction are indicated in chained lines. The protocol module P33A processes a protocol layer, which is arranged over the protocol layer processed by the protocol module P21A and serves for the transmission of the video-ondemand service data by the service module VOD. The protocol module P12A operates on the same protocol layer as the protocol module P11A, the protocol module P11A being for example designed for a wired interface and the protocol module P12A for a wireless interface or the protocol module P11A being designed for an Ethernet connection and the protocol module P12A being designed for an ATM (asynchronous transfer mode) connection. The protocol modules P11A and P12A may be operated in a manner dependent on the respective state of loading of the telecommunication network NET selectively so as to complement one another or alternatively. For instance, it is possible for a video-on-demand server, not illustrated, serving the terminal TERA or a control center of the telecommunication network NET to activate and deactivate the protocol modules P11A and P12A as required.

Figure 3:
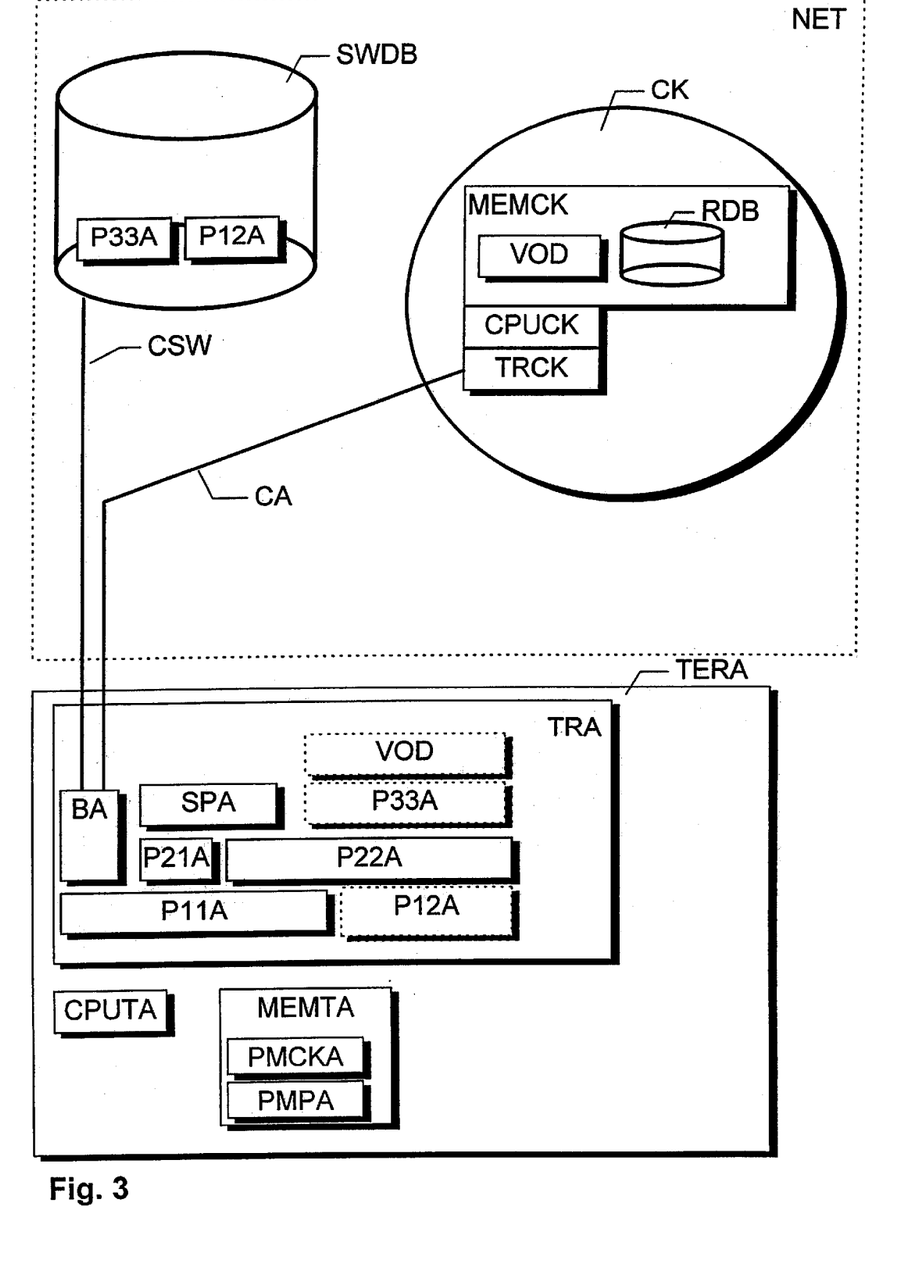
FIG. 3 shows modified form of the arrangement of FIG. 2.

In a further form of the invention, depicted in FIG. 3, the server CK is only a services server, which may supply the terminal TERA with the service module VOD for participation in a video-on-demand service. The terminal TERA sends the server CK a request for the video-on-demand service, which transmits the service module VOD and furthermore the first target protocol properties as retrieved from the data base RDB for the service module VOD. The terminal TERA determines the actual protocol properties of the protocol modules P11A, P21A and P22A as installed on the terminal TERA and sends the test module PMCKA the actual protocol properties and the first target protocol properties as illustrated in FIG. 1. Since as in the example depicted in FIG. 2 such first target protocol properties are not in harmony with the actual or true protocol properties, the terminal TERA requests the second target protocol properties from the server CK. These properties are, as explained, more compatible with the actual protocol properties so that the program module PMCK instructs the terminal TERA only to load and install the protocol modules P12A and P33A from the server SWDB. If necessary it is possible for the program module PMCK to determine further target protocol properties at the server CK until "the least common denominator" has been found with the actual protocol properties of the protocol modules P11A and P21A.

It will be clear from the example of FIG. 3 that offering a service or a service module, in this case the service module VOD, is rendered possible by an independent services supplier, the operator of the server CK. Irrespectively of this the terminal TERA itself provides for its adaptation to the network capabilities necessary for the respective service and will load suitable protocol modules. It is possible as well for respectively separate service servers to be provided for the availability of service modules and a separate network server to be provided for the availability of protocol modules. Services servers and network servers can then cooperate with advantage in the making available of service modules and the protocol modules necessary therefor. As soon as a new service request is made at the services server by the terminal TERA, same will activate the network server for finding and making available of the protocol modules necessary for the desired service.

What is claimed is:

1. A method for setting up data communication with a first communication means having a first protocol module for data communication via a communication protocol, the first protocol module including program code able to be executed by a control means of the first communication means, said method comprising:

transmission by a second communication means of a target protocol property of a second protocol module to a test means that includes a controller, a communicator for transmission and reception between said first communication means and said second communication means and an instruction in a memory, determination by the first communication means of an actual protocol property of the first protocol module, transmission by the first communication means to the test means of the actual protocol property, comparison by the test means of the actual protocol property with the target protocol property, and transmission by the test means of an instruction to the first communication means to install a third protocol module, which comprises program code able to be executed by the control means of the first communication means for data communication in a manner dependent on the target protocol property, wherein, subsequent to the installation of the third protocol module, the first communication means communicates data to the second communication means without passing the data through the test means.

2. The method as claimed in claim 1, wherein the first communication means determines a second actual protocol property of the communications protocol, the first communication means sends the test means the second actual protocol property, the test means compares the second actual protocol property with the target protocol property and in a manner dependent on the first actual protocol property and on the second actual protocol property, the test means instructs the first communication means for use of at least one of the first protocol module and the second protocol module.

3. The method as claimed in claim 1, wherein for the target protocol property or the first actual protocol property, at least one parameter is transmitted for the identification of a first protocol layer or a second protocol layer.

4. The method as claimed in claim 1, wherein for the target protocol property or the first actual protocol property, at least one parameter is transmitted indicative of the description of functions of a first protocol layer or a second protocol layer.

5. The method as claimed in claim 1, wherein for the target protocol property or the actual protocol property, at least one parameter is transmitted for compatibility of a first protocol layer or a second protocol layer.

6. The method as claimed in claim 1, wherein at least one of the target protocol property and the first actual protocol property is transmitted as metadata and modeled by means of a schema language.

7. The method as claimed in claim 1, wherein the second communication means or the test means of the first communication means transmits an instruction for the transmission of the first actual protocol property.

8. A set-up module for a first communication means, which comprises a first protocol module for communication via a communication protocol, said first protocol module and said set-up module respectively containing program code able to be executed by a control means of the first communication means, the set-up module comprising recognition means for detection of an actual protocol property of the communications protocol, said set-up module comprising transmission means for transmission of the first actual protocol property to a test means, and said set-up module possessing receiving means for receiving an instruction from said test means to install a second protocol module dependent upon the result of a comparison performed by the test means of the first actual protocol property and a target protocol property of a second communications means, wherein the second protocol module comprises program code able to be executed by the control means of the first communication means for data communication in a manner dependent on the target protocol property of the second communication means, wherein, subsequent to the installation of the second protocol module, the first communication means communicates data to the second communication means without passing the data through the test means.

9. A test module for a test means for setting up data communication for a communication means, which comprises a first protocol module for data communication via a communication protocol, the first protocol module comprising program code able to be executed by a control means of the communication means, said test module containing program code able to be executed by a control means of the test means and a connector coupled between the first communication means and a second communication means to perform transmission and reception therefor, said test module comprising receiving means for receiving a target protocol property of a second protocol module of the second communication means, said receiving means being adapted to receive at a first actual protocol property of the communication protocol, said test module comprising comparison means for comparison of the first actual protocol property with the target protocol property, and said test module comprising transmission means for the transmission of an instruction to install a third protocol module in the first communication means, which comprises program code able to be executed by the control means of the first communication means for data communication in a manner dependent on the target protocol property of the second communications means as determined by the comparison means, wherein, subsequent to the installation of the third protocol module, the first communication means communicates data to the second communication means without passing the data through the test means.

10. A first communication means for setting up data communication with a second communication means, said first communications means comprising a first protocol module for data communication via a communication protocol, said first protocol module comprising a program code able to be executed by a control means of the first communication means, said first communication means comprising recognition means for detection of an actual protocol property of the communication protocol, said first communication means comprising transmission means for the transmission of the actual protocol property to a test means, and said first communication means comprising receiving means for receiving an instruction from said test means to install a second protocol module dependent upon the result of a comparison performed by the test means of the first actual protocol property and a target protocol property of a second communications means, wherein the second protocol module comprises program code able to be executed by the control means of the first communication means for data communication in a manner dependent on the target protocol property of the second communication means, wherein, subsequent to the installation of the second protocol module, the first communication means communicates data to the second communication means without passing the data through the test means.

11. A test means for setting up data communication with a first communication means, which comprises a first protocol module for data communication via a communication protocol, said first protocol module containing a program code able to be executed by a control means of the first communication means, said test means comprising receiving means for receiving a target protocol property of a second protocol module of a second communications means, said receiving means being adapted for receiving a first actual protocol property of the communications protocol, said test means comprising comparison means for comparison of the first protocol property with the target protocol property, and said test means comprises transmission means for the transmission of an instruction to install a third protocol module in the first communication means, which comprises program code able to be executed by the control means of the first communication means for data communication in a manner dependent on the target protocol property of the second communications means as determined by the comparison means, wherein, subsequent to the installation of the third protocol module, the first communication means communicates data to the second communication means without passing the data through the test means.

12. A computer-readable memory medium comprising at least a set-up module for a first communication means and a first protocol module for communication via a communication protocol, said at least one first protocol module and said set-up module respectively containing a program code able to be executed by a control means of the first communication means, said computer-readable memory medium further comprising a test module containing program code able to be executed by a test means for setting up data communication with the first communication means, and said computer-readable memory medium further comprising a set-up module for a second communication means for setting up data communication with the first communication means, said set-up module containing a second protocol module with program code able to be executed by a control means of the second communication means, wherein:

said set-up module for said first communication means comprises recognition means for detection of an actual protocol property of the first protocol module; transmission means for transmission of the first actual protocol property to a test means; and receiving means for receiving an instruction, in which the first communication means is instructed to execute a subsequent action in a manner dependent on the at least one first actual protocol property;

said test module containing program code able to be executed by a control means of the test means, said test module comprising receiving means for receiving a target protocol property of the second protocol module of the second communication means, said receiving means being adapted to receive a first actual protocol property of the first protocol module, comparison means for comparison of the first actual protocol property with the target protocol property and transmission means for the transmission of an instruction to the first communication means to install a third protocol module dependent upon the result of a comparison performed by the test means of the first actual protocol property and a target protocol property as determined by the comparison means, wherein, subsequent to the installation of the third protocol module, the first communication means communicates data to the second communication means without passing the data through the test means; and said set-up module for said second communication means comprises transmission means for the transmission of the target protocol property of the second protocol module to the test means.

13. An apparatus for managing data communication, comprising:

a first terminal having first protocol module processing a first layer communication protocol and configured to generate an actual protocol property for said first layer communication protocol;

a second terminal having a second protocol module processing the first layer communication protocol and configured to generate a target protocol property for said first layer communication protocol;

a test server, communicative with said first terminal and said second terminal, that receives said actual protocol property and said target protocol property from said first terminal and said second terminal, respectively, and compares said actual protocol property to said target protocol property to determine a correlation therebetween, said test server outputting to said first terminal an instruction to install a third protocol module that corresponds to said second protocol module; and a software server that provides said third protocol module to said first terminal in accordance with a request from said first terminal based on said instruction, wherein, subsequent to the installation of said third protocol module, said first terminal communicates said data to said second terminal without passing said data through said test server.

14. The apparatus of claim 13, said test server comprising:

a memory configured to store commands to perform said comparison and generate said correlation and said instruction;

a connector configured to request and receive said target protocol property from said second terminal, receive said actual protocol property from said first terminal, and transmit said instruction to said first terminal; and a controller that controls operation of said memory and said connector.

15. The apparatus of claim 13, wherein said test server is coupled between said first terminal and said second terminal and is located in a network, and said software server is coupled to said first terminal and is located in a network.

16. The apparatus of claim 13, wherein said first terminal is configured to be modified to perform video on demand data communication.

17. The apparatus of claim 13, said first terminal further comprising:

a controller that interfaces with said first protocol module;

a test module configured to perform said comparison and generate said instruction and said correlation; and a determiner that determines said actual protocol property and generates a parameter to be passed to at least one of said test module and said test server.

* * * * *